(12) United States Patent
Minazawa

(10) Patent No.: US 7,875,374 B2
(45) Date of Patent: Jan. 25, 2011

(54) SUBSTRATE FOR PERPENDICULAR MAGNETIC RECORDING MEDIA AND PERPENDICULAR MAGNETIC RECORDING MEDIA USING SAME

(75) Inventor: Hiroshi Minazawa, Matsumoto (JP)

(73) Assignee: Fuji Electric Device Technology Co., Ltd. (JP)

( * ) Notice: Subject to any disclaimer, the term of this patent is extended or adjusted under 35 U.S.C. 154(b) by 174 days.

(21) Appl. No.: 12/120,528

(22) Filed: May 14, 2008

(65) Prior Publication Data

US 2009/0148725 A1 Jun. 11, 2009

(30) Foreign Application Priority Data

Dec. 7, 2007 (JP) ............................. 2007-317286

(51) Int. Cl.
*G11B 5/82* (2006.01)
*G11B 5/64* (2006.01)

(52) U.S. Cl. .................. 428/846.9; 428/848.2; 360/135; 65/102

(58) Field of Classification Search ................ 428/848, 428/848.2, 831, 840.1, 846.9; 355/77; 349/139; 360/114, 135; 65/102
See application file for complete search history.

(56) References Cited

U.S. PATENT DOCUMENTS 6,210,775 B1 * 4/2001 Ejiri et al. ................ 428/840.1

(Continued)

FOREIGN PATENT DOCUMENTS

JP 2006-286029 A 10/2006

(Continued)

OTHER PUBLICATIONS

Ono et al.; "Influence of Substrate Surface Shape at C-axis Distribution in Perpendicular Media"; Digest of the 31st Annual Conference on Magnetics in Japan; 2007; p. 264. Cited in specification.

(Continued)

*Primary Examiner*—Kevin M. Bernatz
*Assistant Examiner*—Louis Falasco
(74) *Attorney, Agent, or Firm*—Rossi, Kimms & McDowell LLP

(57) ABSTRACT

Substrates for perpendicular magnetic recording media, and perpendicular magnetic recording media using such substrates, are disclosed. By setting the substrate inclination angle, or a parameter related to substrate shape relating to this angle, within an appropriate range, magnetic recording media can be obtained with excellent read signal quality and signal quality stability, regardless of the final substrate machining method. In a substrate for donut-shape magnetic recording media, comprising a main surface, an inner circumferential surface extending along the inside of the main surface, and an outer circumferential surface extending along the outside of the main surface, when the shape of the main surface is defined by a function Z(x,y) of x-y coordinates, the root mean square inclination angle (θsΔq), defined as the inverse tangent (tan−1 (sΔq)) of the root means square inclination (sΔq) which is the root mean square over the entire main surface of the micro-region surface inclination (Δρ) of the main surface, expressed by the following equation, is 5° or less Equation 1

$$\Delta\rho = \left[\left(\frac{\partial z(x,y)}{\partial x}\right)^2 + \left(\frac{\partial z(x,y)}{\partial y}\right)^2\right]^{\frac{1}{2}}.$$

6 Claims, 8 Drawing Sheets

U.S. PATENT DOCUMENTS

| | | | |
|---|---|---|---|
| 2003/0113506 A1* | 6/2003 | Takahashi et al. | 428/65.3 |
| 2004/0224186 A1* | 11/2004 | Roesler et al. | 428/848.1 |
| 2005/0142387 A1* | 6/2005 | Araki et al. | 428/848 |
| 2005/0162598 A1* | 7/2005 | Choi et al. | 349/139 |
| 2005/0214588 A1* | 9/2005 | Iwasaki et al. | 428/831 |
| 2006/0222908 A1 | 10/2006 | Abe et al. | |
| 2006/0279722 A1* | 12/2006 | De Mol | 355/77 |

FOREIGN PATENT DOCUMENTS

| | | |
|---|---|---|
| JP | 2007-26536 A | 2/2007 |
| WO | 2007/01090 A1 | 1/2007 |
| WO | 2007010908 A1 | 1/2007 |

OTHER PUBLICATIONS

Search Report issued in corresponding Singapore application # 200805729-1, dated Apr. 29, 2010.

* cited by examiner

SUBSTRATE FOR PERPENDICULAR MAGNETIC RECORDING MEDIA AND PERPENDICULAR MAGNETIC RECORDING MEDIA USING SAME

CROSS REFERENCE TO RELATED APPLICATIONS

This application claims priority from application Serial No. 2007-317286, filed on Dec. 7, 2007. The disclosure of the priority application, in its entirety, including the drawings, claims, and the specification thereof, is incorporated herein by reference.

BACKGROUND OF THE INVENTION

A. Field of the Invention

This invention relates to a substrate for perpendicular magnetic recording media mounted in a fixed magnetic recording device (hard disk device), which is an external storage device for computers or for consumer equipment. More specifically, the substrate for perpendicular magnetic recording media of this invention is a perpendicular magnetic recording media substrate enabling perpendicular magnetic recording media with superior performance and quality. This invention also relates to perpendicular magnetic recording media using such a substrate.

B. Description of the Related Art

Magnetic disk devices, which are advancing toward markedly higher recording densities even while costs decline, play a central role as external memory devices for computers, and in recent years have also begun to be mounted in other digital consumer equipment as well. In addition, magnetic disk devices are becoming smaller, and are beginning to be adopted in portable music playback devices and other products as well.

Longitudinal recording methods, in which the magnetization easy axis of the magnetic recording layer is oriented parallel to the substrate surface in the magnetic recording media of the magnetic disk device, have been adopted in the prior art. In recent years, in order to attain still higher recording densities, a perpendicular recording method has been adopted in which the magnetization easy axis of the magnetic recording layer is oriented perpendicularly to the substrate surface. In this perpendicular recording method, the magnetization in adjacent regions is aligned in a direction perpendicular to the recording plane, so that the magnetization is stable in magnetization reversal regions even at high recording densities, and excellent thermal fluctuation characteristics and noise characteristics can be realized.

In perpendicular magnetic recording media, normally a backing layer of soft magnetic material is positioned between the substrate and the magnetic recording layer. In perpendicular magnetic recording media, writing of information is achieved by passing the leakage flux from a single magnetic pole head perpendicularly through the substrate plane.

In such perpendicular magnetic recording media, the quality of read signals depends on the perpendicular orientation of the magnetization easy axis in the magnetic recording layer. When this perpendicular orientation is poor, the leakage magnetic flux from the magnetic recording layer is inclined with respect to the substrate plane, so that media noise is increased and the S/N characteristic declines.

The orientation dispersion angle ($\Delta\theta 50$), which indicates the crystal plane inclination distribution of the layer of interest (for example, the magnetic recording layer) in the magnetic recording media, is an index indicating the perpendicular orientation of the magnetization easy axis. This orientation dispersion angle ($\Delta\theta 50$) is defined as the peak half-maximum width of the rocking curve obtained in X-ray diffraction for a specific orientation plane in the target layer, and corresponds to the distribution center of the angle made by the horizontal plane and the specific orientation plane. In order to improve the S/N characteristics, the orientation dispersion angle ($\Delta\theta 50$) of the magnetic recording layer must be decreased.

The orientation dispersion angle ($\Delta\theta 50$) of the magnetic recording layer depends on the orientation dispersion angle ($\Delta\theta 50$) of the orientation control layer positioned directly below the magnetic recording layer in the magnetic recording media. Further, the orientation dispersion angle ($\Delta\theta 50$) of the orientation control layer depends on the surface shape of the substrate positioned below the orientation control layer. In recent years, methods have been disclosed for controlling the orientation dispersion angle ($\Delta\theta 50$) of the orientation control layer, which effects the orientation dispersion angle ($\Delta\theta 50$) of the magnetic recording layer, through the surface roughness (Ra) of the substrate, which is one parameter related to substrate shape.

In Japanese Patent Application Laid-open No. 2006-286029 (corresponding to U.S. Patent No. 2006 222908 and to Chinese Patent No. CN1841513A), a perpendicular magnetic disk device is disclosed comprising perpendicular magnetic recording media having a nonmagnetic substrate, the surface roughness (Ra) of which is 0.35 nm or lower, a soft magnetic layer, an intermediate nonmagnetic layer the perpendicular orientation ($\Delta\theta 50$) of which is 4° or less, and a perpendicular recording layer formed from magnetic material exhibiting perpendicular anisotropy; and a magnetic head, having a write head, with a main magnetic pole, return yoke, and exciting coil, and a magnetoresistance effect read head; in this device, the flying height f of the magnetic head and the average roughness (Ra) of the perpendicular magnetic recording media surface satisfy the relation $f > 0.61 Ra^2 - 3.7 Ra + 5.9$.

In Japanese Patent Application Laid-open No. 2007-26536 (corresponding to International Patent Application No. WO2007/010908A1), a magnetic recording medium is disclosed in which are provided, at least, a soft magnetic backing layer of a soft magnetic material, an orientation control film which controls the orientation of the film immediately above, a perpendicular magnetic film, the magnetization easy axis of which is oriented primarily perpendicularly to the substrate, and a protective film, and in which the magnetic anisotropy ratio (Hmr/Hmc) of the soft magnetic backing layer is 1 or less, and moreover the orientation dispersion angle ($\Delta\theta 50$) is from 1 to 6°.

In "Influence of Substrate Surface Shape at C-axis Distribution in Perpendicular Media", Masaru Ono et al., Yamagata Fujitsu Ltd., Dig. 31st Annual Conf. Magn. Soc. Jpn. (2007), p. 264, experiments are disclosed in which, after using DC magnetron sputtering to form an FeCo alloy soft magnetic backing layer, Ru intermediate layer, and CoCrPt alloy magnetic layer in order on substrates on which oxide abrasives and diamond abrasives had been employed, CVD was used to form a carbon protective layer, AFM was employed to measure the substrate surface shape in a 1 μm×1 μm field, the crystal orientation was evaluated by the rocking curve method using XRD, and read/write characteristics were evaluated using a 130 Gb/in$^2$-equivalent perpendicular TuMR write head. According to these experimental results, it is reported, there is a deviation among the substrates in the correlation between the calculated average roughness Ra of the substrate surface and the crystal orientation dispersion $\Delta\theta 50$ of the [002] plane of Ru, which is the intermediate layer.

Further, with respect to the inclination angle slope obtained by calculating the slope at various locations on the substrate and averaging and the crystal orientation dispersion Δθ50 of Ru, it is reported that good correlation is observed between the inclination angle slope and the crystal orientation dispersion Δθ50 regardless of the abrasive material, and that the crystal orientation of the Ru intermediate layer is greatly influenced by the inclination from the horizontal plane of the substrate surface.

Thus there have been numerous disclosures of technology to control the orientation dispersion angle (Δθ50) of the orientation control layer by means of the substrate surface roughness (Ra). However, as is corroborated by "Influence of Substrate Surface Shape at C-axis Distribution in Perpendicular Media", Masaru Ono et al., Yamagata Fujitsu Ltd., Dig. 31st Annual Conf. Magn. Soc. Jpn. (2007), p. 264 and in the Embodiments section below, it has been clarified that the relation between the substrate surface roughness (Ra) and the orientation dispersion angle (Δθ50) of the orientation control layer or of the magnetic recording layer differs depending on the final machining method used for the substrate surface. For example, as described in the Embodiments section below, it has been clarified that the orientation dispersion angle (Δθ50) of the magnetic recording layer differs, even for the same surface roughness (Ra), for a case of finish-polishing of the substrate using a double side polisher with a foam urethane pad affixed and a colloidal silica abrasive liquid, and for a case of etching of the substrate using hydrofluoric acid. Hence the substrate surface roughness (Ra) cannot be regarded as a parameter of the substrate shape which enabled adequate control of the orientation dispersion angle (Δθ50) of the orientation control layer or magnetic recording layer.

On the other hand, as disclosed in "Influence of Substrate Surface Shape at C-axis Distribution in Perpendicular Media", Masaru Ono et al., Yamagata Fujitsu Ltd., Dig. 31st Annual Conf. Magn. Soc. Jpn. (2007), p. 264, there is a good correlation, regardless of the polishing material, between the inclination angle obtained by averaging the calculated inclination at different locations of the substrate, and the crystal orientation dispersion Δθ50 of the orientation control layer (in Japanese Patent Application Laid-open No. 2006-286029, the intermediate layer). Hence there is a need to develop technology in which an appropriate range is set for this inclination angle, or for a parameter relating to the substrate shape in relation to this inclination angle, in order to improve the orientation dispersion angle (Δθ50) of the orientation control layer and magnetic recording layer regardless of the final machining method used on the substrate.

The present invention is directed to overcoming or at least reducing the effects of one or more of the problems set forth above.

SUMMARY OF THE INVENTION

An object of this invention is to provide a substrate for perpendicular magnetic recording media which, by setting an appropriate range for the inclination angle of the substrate or for a parameter related to the substrate shape relating to this angle, enables excellent signal quality and stability of signal quality of the magnetic recording media, regardless of the final machining method used on the substrate. A further object of the invention is to provide perpendicular magnetic recording media which employs such a substrate.

This invention relates to a substrate for donut-shape perpendicular magnetic recording media, comprising a main surface, an inner circumferential surface extending along the inside of the main surface, and an outer circumferential surface extending along the outside of the main surface, and in which, when the shape of the main surface is defined by a function Z(x,y) of x-y coordinates, the root mean square inclination angle (θsΔq), defined as the inverse tangent ($\tan^{-1}$ (sΔq)) of the root mean square inclination (sΔq) which is the root mean square over the entire main surface of the micro-region surface inclination (Δρ) of the main surface, expressed by the following equation, is 5° or less.

Equation 1

$$\Delta \rho = \left[ \left( \frac{\partial z(x, y)}{\partial x} \right)^2 + \left( \frac{\partial z(x, y)}{\partial y} \right)^2 \right]^{\frac{1}{2}}$$

A substrate for perpendicular magnetic recording media of this invention can be used in a fixed magnetic recording device (hard disk device), which is an external storage device for a computer or for consumer equipment. It is desirable that a substrate for perpendicular magnetic recording media of this invention have a root mean square inclination angle (θsΔq) of 3° or less. Further, in such a substrate, when the average grain diameter of magnetic grains constituting the perpendicular recording layer formed above the substrate in magnetic recording media is D, and the average interval between magnetic grains is δ, and when, in a cross-sectional view of the substrate, the surface shape is viewed as sinusoidal curves, it is desirable that the period λ of the curves be at least twice as large as the sum of the average grain diameter D and the average interval δ, and still more desirable that the period λ be at least four times as large as this sum.

This invention further relates to perpendicular magnetic recording media, in which at least a soft magnetic layer, orientation control layer, and a perpendicular recording layer comprising a magnetic material having perpendicular anisotropy are formed on the substrate as described above.

By setting the root mean square inclination angle (θsΔq) within a prescribed range, a substrate for perpendicular magnetic recording media of this invention enables the realization of an excellent orientation dispersion angle (Δθ50) in the orientation control layer and magnetic recording layer within media using the substrate. Hence in perpendicular magnetic recording media using a substrate of this invention, excellent S/N characteristics and S/N stability are achieved, and consequently the read signal quality and signal quality stability can be maintained at high levels.

BRIEF DESCRIPTION OF THE DRAWINGS

The foregoing advantages and features of the invention will become apparent upon reference to the following detailed description and the accompanying drawings, of which:

FIG. 8 is a cross-sectional schematic diagram of substrates for perpendicular magnetic recording media, in which

DETAILED DESCRIPTION OF SPECIFIC EMBODIMENTS

Principle of the Invention

Figure 1:
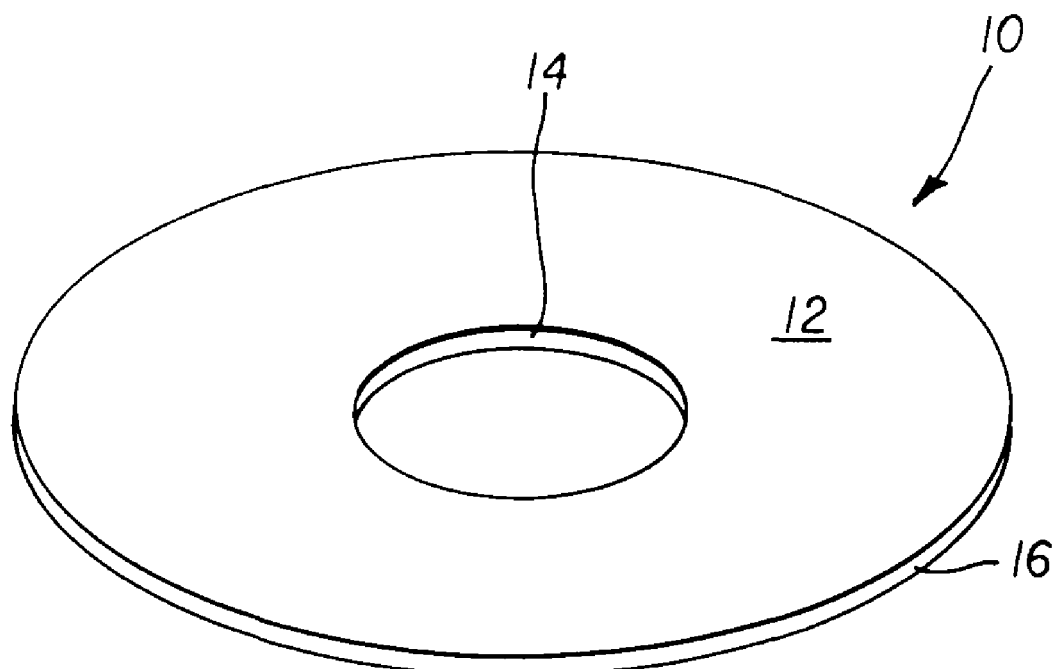
FIG. 1 is a perspective view showing a donut-shape substrate for perpendicular magnetic recording media 10 of the invention.

Below, the principle of this invention is explained.

1-1. Relation Between Orientation Dispersion Angle (Δθ50) and Parameters Related to Substrate Surface Shape The orientation dispersion angle (Δθ50) of the magnetic recording layer, which exerts an influence on the S/N characteristics of the magnetic recording media, is determined by the orientation dispersion angle (Δθ50) of the orientation control layer immediately below the magnetic recording layer. The orientation dispersion angle (Δθ50) of the orientation control layer depends on the shape of the surface of the film immediately below. A backing layer of soft magnetic material is normally positioned immediately below the orientation control layer, and the orientation control layer is formed along the surface shape of this backing layer, so that the inclination angle of the backing layer surface structure determines the orientation dispersion angle (Δθ50) of the orientation control layer, and consequently that of the magnetic recording layer as well.

On the other hand, the soft magnetic material used in the backing layer must be magnetically isotropic, and so in general an amorphous material is used. Hence the backing layer surface shape satisfactorily reproduces the surface shape of the substrate positioned beneath, and consequently the surface shape of the backing layer depends on the surface shape of the substrate.

From the above, in order to control the orientation dispersion angle (Δθ50) of the magnetic recording layer, it is sufficient to control the inclination angle which arises from the structure on the substrate surface. Hence a variety of parameters relating to the substrate surface shape are studied for use in controlling the orientation dispersion angle (Δθ50) of the magnetic recording layer.

1-2. Substrate Surface Roughness (Ra) as a Parameter Relating to Substrate Surface Shape As stated above, the substrate surface roughness (Ra) is a parameter relating to the substrate shape which is inadequate for controlling the orientation dispersion angle (Δθ50) of the orientation control layer and magnetic recording layer. This is because, in a cross-sectional view of the substrate, the surface roughness (Ra) takes into consideration only the vertical component of the surface shape, and horizontal components are not considered, whereas the orientation dispersion angle (Δθ50) takes into consideration both vertical and horizontal components of the surface shape. That is, because the surface roughness (Ra) and the orientation dispersion angle (Δθ50) have different components representing the depressions/protrusions in the substrate surface, it is not reasonable to consider these equally as in a one-to-one correspondence.

Here, a horizontal component of the substrate surface shape means the period of sinusoidal curves when, in a cross-sectional view of the substrate, the depression/protrusion shapes of the substrate surface are viewed as sinusoidal curves. Further, the vertical component of the substrate surface shape means the amplitude when the shape is seen as the above sinusoidal curves. As a specific method for viewing the depression/protrusion shapes of the substrate surface as sinusoidal curves, a method can be applied which uses a sinusoidal curve having one period, obtained by a Fourier transform. Such a technique using a Fourier transform is a general method for presenting all shapes as sinusoidal curves, and is both practical and logical.

Figure 8A:
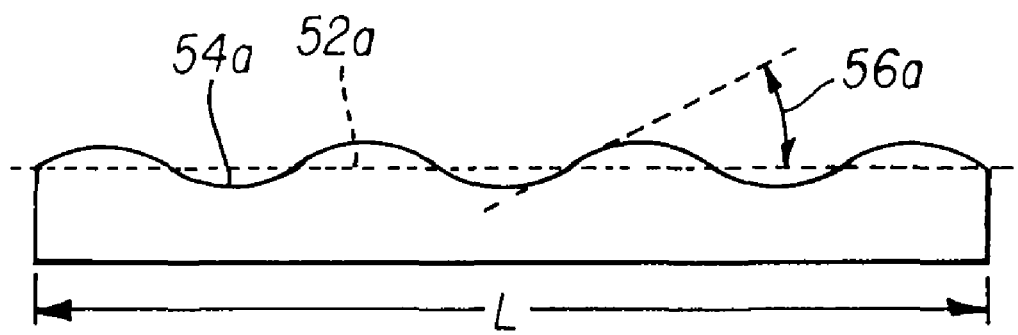
FIG. 8A shows a substrate structure comprising sinusoidal curves (depressions/protrusions) with 7/2 periods within the horizontal component L in a substrate cross-sectional view.
Figure 8B:
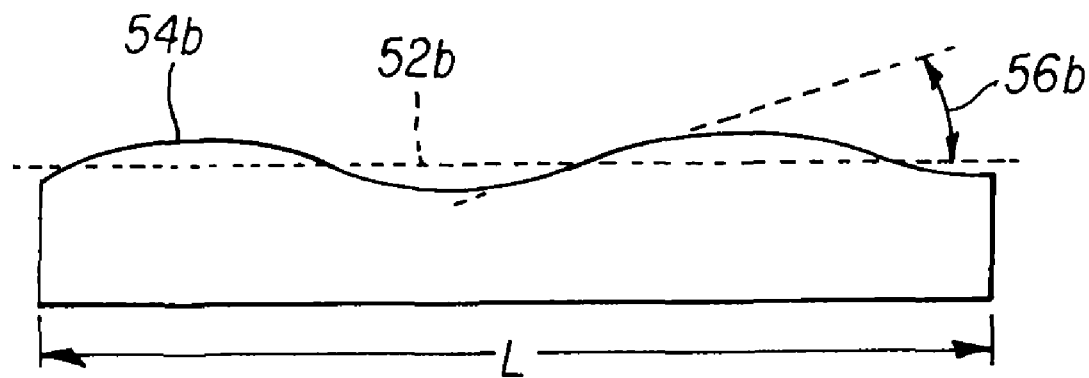
FIG. 8B shows a substrate structure comprising sinusoidal curves (depressions/protrusions) with 7/4 periods within the same horizontal component L as for the substrate in FIG. 8A; and, FIG. 9 is a cross-sectional schematic view of two types of perpendicular magnetic recording media, respectively comprising substrates 62a and 62b, soft magnetic layers 64a and 64b, orientation control layers 66a and 66b, and magnetic recording layers 68a and 68b, in which, when D is the average grain diameter of magnetic grains constituting the magnetic recording layer and Δ is the average interval between these magnetic grains.

FIG. 8 is a cross-sectional schematic view of substrates for perpendicular magnetic recording media, in which FIG. 8A shows the structure of a substrate having sinusoidal curves (depressions/protrusions) with 7/2 periods within a horizontal component L in the substrate cross-sectional view, while FIG. 8B shows the structure of a substrate having sinusoidal curves (depressions/protrusions) with 7/4 periods within the same horizontal component L as for the substrate in FIG. 8A. In the figure, the symbols 52a, 52b denote the averaged plane of the depression/protrusion shapes for each of the substrates, that is, the center lines of the sinusoidal curves; the symbols 54a, 54b indicate the surface shapes of the substrates; and the symbols 56a, 56b indicate the inclination angles of the depression/protrusion shapes of the substrates. Thus even when the surface roughness is the same (when the maximum heights (amplitudes) from the center lines 52a, 52b in FIGS. 8A and 8B are the same), if the number of depressions/protrusions contained in the same horizontal component L is different, the inclination angles formed on the substrates are different. From the above, research is necessary on parameters, other than the substrate surface roughness (Ra), which are parameters relating to the substrate shape and which control the orientation dispersion angle (Δθ50) of the orientation control layer and the magnetic recording layer.

1-3. Root Mean Square Inclination Angle (θsΔq) as a Parameter Relating to Substrate Surface Shape Due to this demand, the inventor studied the root mean square inclination angle (θsΔq), described below, as a parameter relating to substrate shape.

First, the inclination angle of the substrate surface shape is determined as follows. As the substrate main surface shape, the shape of the surface is defined by a function Z(x,y) of x-y coordinates. Here, the main surface means the flat surface on one side of the substrate, and x-y coordinates mean coordinates resulting when the x axis and y axis are set arbitrarily in this flat plane so as to make a 90° angle.

Next, the function Z(x,y) is used to determine the micro-region surface inclination (Δρ) on the main surface as represented by equation (1) below.

Equation 1

$$\Delta\rho = \left[\left(\frac{\partial z(x,y)}{\partial x}\right)^2 + \left(\frac{\partial z(x,y)}{\partial y}\right)^2\right]^{\frac{1}{2}} \quad (1)$$

Further, the above Δp is used to determine the root mean square inclination (sΔq) expressed by equation (2) below. In equation (2) below, lx and ly are respectively reference lengths in the x direction and y direction in the above-described x-y coordinates. These reference lengths are for example equivalent to measurement regions when measuring the surface shape of the substrate.

Equation 2

$$S\Delta q = \sqrt{\frac{1}{l_x \cdot l_y} \int_0^{l_x} \int_0^{l_y} \Delta\rho^2 \, dx\, dy} \quad (2)$$

Finally, the inverse tangent of the root mean square inclination (sΔq) expressed by the above equation (2) (tan−1 (sΔq)) is taken to be the root mean square inclination angle (θsΔq), and this is defined as a parameter indicating the inclination angle of the substrate surface.

This root mean square inclination angle (θsΔq) differs from the surface roughness (Ra) of the substrate in being a parameter relating to the substrate shape which enables adequate control of the orientation dispersion angle (Δθ50) of the orientation control layer and magnetic recording layer. This is because the root mean square inclination angle (θsΔq), similarly to the orientation dispersion angle (Δθ50), is a parameter relating to the surface shape which takes into consideration both vertical and horizontal components of the surface shape. That is, the components of the root mean square inclination angle (θsΔq) and the orientation dispersion angle (Δθ50) coincide when representing depressions/protrusions in the substrate surface, and so it is reasonable to regard these as in a one-to-one correspondence (corresponding to a linear function).

1-4. Appropriate Range of the Root Mean Square Inclination Angle (θsΔq)

It is preferable that the root means square inclination angle (θsΔq) be 5° or less, and excellent S/N characteristics can be realized in magnetic recording media which employs a substrate satisfying this condition. It is still more preferable that the root mean square inclination angle (θsΔq) is 3° or less, and even more excellent S/N characteristics can be realized in magnetic recording media which uses a substrate satisfying this condition.

1-5. Specific Procedure for Attaining the Appropriate Range for the Root Mean Square Inclination Angle (θsΔq)

Next, a specific procedure for obtaining such a substrate with a root mean square inclination angle (θsΔq) of 5° or less is explained.

Figure 9B:
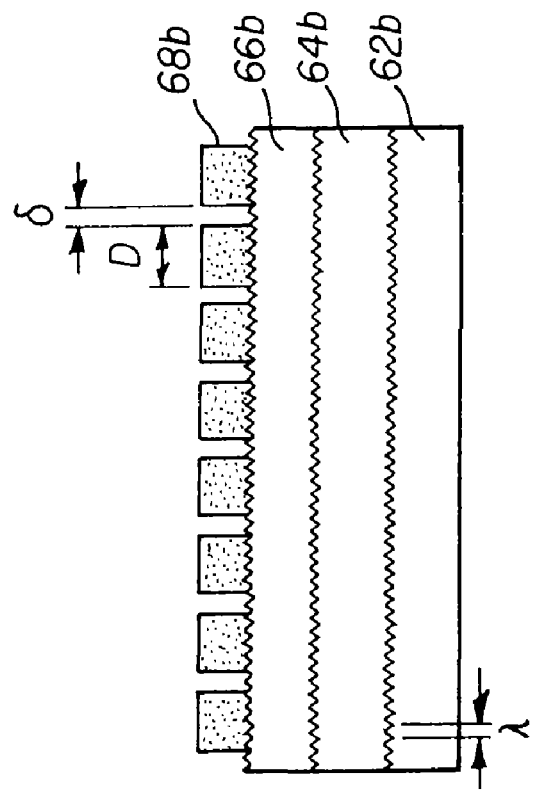
FIG. 9B shows media for which the period λ is approximately 0.18 times (D+δ).
Figure 9A:
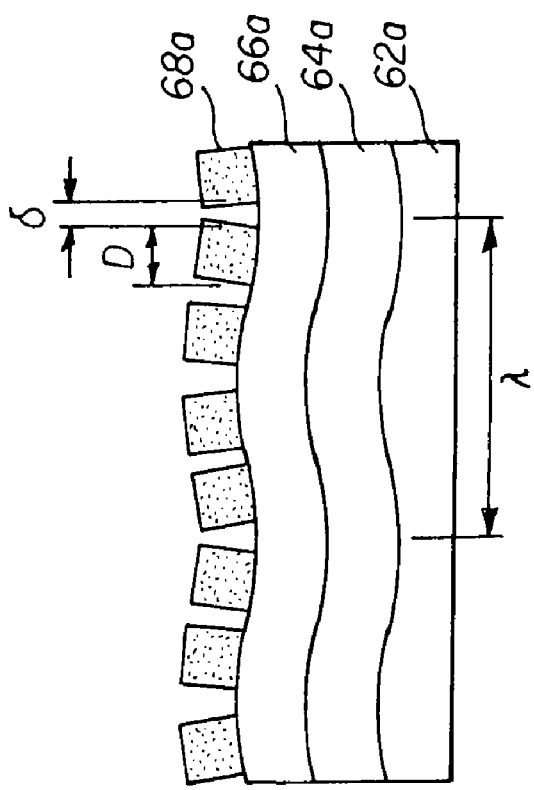
FIG. 9A shows media for which the period λ when the surface shape of the substrate and similar is viewed as sinusoidal curves is approximately four times (D+δ)

FIG. 9 is a cross-sectional schematic diagram showing two types of magnetic recording media, respectively, comprising substrates 62a, 62b; soft magnetic layers 64a, 64b; orientation control layers 66a, 66b; and magnetic recording layers 68a, 68b. In the figure, D is the average grain diameter of magnetic grains constituting the magnetic recording layer, and δ is the average interval between these magnetic grains. The media shown in FIG. 9A is media in which, when the surface shape of the substrate and similar is viewed as a sinusoidal curve, the period λ is approximately four times (D+δ); the media shown in FIG. 9B is media in which the period λ is approximately 0.18 times (D+δ).

When the period λ is considerably large relative to (D+δ), as in the case of the media shown in FIG. 9A, the surface of the orientation control layer on which magnetic grains 68a constituting the magnetic recording layer grow has a gentle sinusoidal curve shape, and so it is thought that the magnetic grains 68a grow substantially perpendicularly. Hence in the media shown in FIG. 9A, the root mean square inclination angle (θsΔq) indicating the inclination angle of the substrate surface is thought to be substantially zero. As a result the orientation dispersion angles (Δθ50) of the soft magnetic layer and magnetic recording layer are also small, and it is thought that excellent S/N characteristics are attained.

When the period λ is considerably small relative to (D+δ), as in the case of the media shown in FIG. 9B, the surface of the orientation control layer on which magnetic grains 68b constituting the magnetic recording layer grow can overall be regarded as a horizontal surface, and so it is thought that the magnetic grains 68b grow perfectly perpendicularly. Hence in the media shown in FIG. 9B, the root mean square inclination angle (θsΔq) indicating the inclination angle of the substrate surface is thought to be exactly zero. As a result the orientation dispersion angles (Δθ50) of the soft magnetic layer and magnetic recording layer are also very small, and it is thought that excellent S/N characteristics are attained.

In contrast with these cases, when the relation between the period λ and (D+δ) is precisely midway between those of the media shown in FIG. 9A and the media shown in FIG. 9B, the surface of the orientation control layer cannot be said to describe a gentle sinusoidal curve, and yet overall the surface cannot be said to be horizontal. Therefore in this case the probability that magnetic grains will not grow perpendicularly on the orientation control layer is high, and the root mean square inclination angle (θsΔq), indicating the inclination angle of the substrate surface, is thought to be considerably large. Hence the orientation dispersion angles (Δθ50) of the soft magnetic layer and magnetic recording layer are also considerably large, and it is thought that an excellent S/N characteristic is not attained.

Hence the inventor studied conditions for realizing an excellent S/N characteristic, that is, specific procedures to satisfy the condition that the root mean square inclination angle (θsΔq) of the substrate main surface is 5° or less, through a prescribed relation between the above-described period λ and (D+δ). As a result, it was found that if the period λ is approximately twice (D+δ) or greater, the root mean square inclination angle (θsΔq) is 5° or less, the orientation dispersion angle (Δθ50) of the soft magnetic layer and similar is improved, and excellent S/N characteristics can be obtained.

1-6. Method of Calculation of Various Parameters, and Method of Measurement of the S/N Characteristic as the Final Evaluation Quantity Below, the various parameters appearing in the above principle, that is, the method of calculation of the orientation dispersion angle ($\Delta\theta50$) of the magnetic recording layer and of the root mean square inclination angle ($\theta s \Delta q$), as well as a method of measurement of the S/N characteristic which is the final evaluation quantity, are explained.

1-6-1. Method of Calculation of Orientation Dispersion Angle ($\Delta\theta50$) of Magnetic Recording Layer The half-maximum width of the rocking curve obtained from measurements of magnetic recording media by X-ray diffraction is used to calculate the orientation dispersion angle ($\Delta\theta50$) of the magnetic recording layer.

1-6-2. Method of Calculation of the Root Mean Square Inclination Angle ($\theta s \Delta q$)

First, the average grain diameter D of magnetic grains constituting the magnetic recording layer, and the average interval $\delta$ between magnetic grains, are measured using AFM (Atomic Force Microscopy) and other methods, as explained below.

Next, portions other than the magnetic recording layer to be observed are removed from the magnetic recording media obtained. Normally in magnetic recording media, a soft magnetic layer, orientation control layer, magnetic recording layer, protective layer, and lubricating layer are formed on both sides of a substrate. Ion milling is used to remove the lubricating layer and protective layer from one side of the media (the side used for magnetic recording layer observation). The other side of the substrate (the side not used for magnetic recording layer observation) is subjected to mechanical polishing, and after removing the lubricating layer, protective layer, magnetic recording layer, orientation control layer, and soft magnetic layer, ion milling of the remaining substrate surface is used to perform finishing. By this means, a magnetic recording layer is exposed as a surface for observation.

Next, the average grain diameter D of magnetic grains constituting the magnetic recording layer, and the average interval $\delta$ between grains, are measured using the results of observations from the perpendicular direction of the magnetic recording layer exposed on one side of the media, using transmission electron microscopy (TEM).

A substrate prior to magnetic recording media formation is subjected to ultrasonic immersion cleaning, scrub-cleaning, and/or isopropyl alcohol (IPA) cleaning, to obtain a clean surface.

It has already been stated that, in order to lower the root mean square inclination angle ($\theta s \Delta q$) of the substrate to 5° or less, one condition is to increase the period $\lambda$ to approximately twice (D+$\delta$) or greater. For this reason, it is vital that the method used to measure the substrate surface shape be a method with spatial resolution higher than 2(D+$\delta$).

Normally, the average grain diameter D of magnetic grains shown in FIG. 9, and the average interval $\delta$ between magnetic grains, are of order several nm, and so it is preferable that AFM (Atomic Force Microscopy) behaving nm order spatial resolution be used. Further, from the results of measurements of the surface shape obtained, as a method of extracting a substrate surface shape for which the period $\lambda$ is twice (D+$\delta$) or greater, when using in order a Gaussian filter, Fourier transform (FFT) and inverse Fourier transform (IFFT), a method of using a cutoff filter can be employed.

As another method of measuring the substrate surface shape, perpendicular cross-sectional machining of the main surface of the substrate may be performed, and transmission electron microscopy (TEM), or scanning secondary electron microscopy (SEM), can be used to measure the cross-sectional shape in two dimensions, and a cutoff filter can similarly be used for the surface shape obtained.

1-6-3. Method of Measurement of S/N Characteristics of Magnetic Recording Media

Evaluation of the read signal quality of the magnetic recording media obtained is performed by a well-known method for read signal S/N characteristic measurement, after writing signals at an arbitrary recording density.

1-7. Method of Calculation of Relation Between Various Parameters and S/N Characteristic Through the above measurement method and calculation method, the relation between the S/N characteristic of the magnetic recording media and the orientation dispersion angle ($\Delta\theta50$) of the magnetic recording layer, as well as the relation between the S/N characteristic of the magnetic recording media and the root mean square inclination angle ($\theta s \Delta q$), are obtained.

First, based on the above results, the relation between the S/N characteristic of the magnetic recording media and the orientation dispersion angle ($\Delta\theta50$) of the magnetic recording layer is obtained.

Next, as explained above, based on the fact that components used when representing depressions/protrusions in the substrate surface all coincide, it is thought that the root mean square inclination angle ($\theta s \Delta q$) and the orientation dispersion angle ($\Delta\theta50$) have a linear function correspondence. Therefore, taking into consideration the relation between the S/N characteristic of the magnetic recording media already obtained and the orientation dispersion angle ($\Delta\theta50$) of the magnetic recording layer, as well as the linear-function relation between the root mean square inclination angle ($\theta s \Delta q$) and the orientation dispersion angle ($\Delta\theta50$), the relation between the S/N characteristic of the magnetic recording media and the root mean square inclination angle ($\theta s \Delta q$) is obtained.

2. Substrate for Perpendicular Magnetic Recording Media and Perpendicular Magnetic Recording Media, as Well as Method of Manufacture of These Next, substrates for perpendicular magnetic recording media of this invention based on the principle explained above, as well as perpendicular magnetic recording media using such substrates, are explained. The following are merely examples, and various modifications to the design can be made as appropriate within the normal scope of creative power of the practitioner.

2-1. Substrate for Perpendicular Magnetic Recording Media

FIG. 1 is a perspective view showing donut-shape substrate 10 for perpendicular magnetic recording media of this invention. Substrate 10 comprises main surface 12, and inner and outer circumferential surfaces 14 and 16 extending along the inside and outside respectively of main surface 12. The glass substrate shape can have an outer diameter of 65 mm, an inner diameter of 20 mm, and a plate thickness of 0.635 mm (2.5-inch type), or an outer diameter of 48 mm, an inner diameter of 12 mm, and a plate thickness of 0.508 mm (1.8-inch type).

No limitations in particular are placed on the material of substrate 10 for perpendicular magnetic recording media, so long as the material is nonmagnetic. Specifically, for example, aluminosilicate glass, soda lime glass, soda aluminosilicate glass, aluminoborosilicate glass, borosilicate glass, quartz glass, chain silicate glass, or crystallized glass can be used. In particular, it is preferable that an amorphous glass be used in a glass substrate suitable for perpendicular magnetic disks to be used for high-density recording, from the standpoint of the high flatness of the surface. In addition to the above materials, aluminum, an aluminum alloy, a carbon material, quartz, and other nonmagnetic materials can be used.

2-2. Method of Manufacture of Substrates for Perpendicular Magnetic Recording Media Below, an example of a method of manufacture of substrates for perpendicular magnetic recording media is described.

2-2-1. Specification of the Shape of the Substrate for Perpendicular Magnetic Recording Media Substrate material in a prescribed shape, such as a donut shape, is obtained by the press molding method, or by cutting from plate glass or another method. Here, as the press molding method and the method of cutting from plate glass, any well-known technique can be used.

2-2-2. Inner and Outer Diameter Machining

A grinding machine and a grooved diamond grinding wheel (#400), capable of simultaneous circumferential machining of the inner circumferential surface and the outer circumferential surface, are used for inner and outer diameter machining of the glass material obtained by press molding or similar. Appropriate dimensions for inner and outer diameter machining can be calculated by adding removal amounts in subsequent polishing and etching to the inner and outer diameters of the product.

2-2-3. Lapping

Lapping of the surface of the glass material subjected to the above inner and outer diameter machining is performed, to obtain the flatness necessary for a magnetic disk (for example, for a 2.5-inch substrate, 4 µm or less). For example, in the case of a 2.5-inch substrate for a product of plate thickness 0.635 mm±0.015 mm, lapping is performed to approximately 0.64±0.010 mm to 0.68±0.010 mm. This plate thickness is determined by the subsequent polishing removal amount, and is the amount necessary to completely erase machining marks (abrasive marks) due to lapping and obtain a mirror finish; it is preferable that this amount be 0.05 to 0.1 mm for both surfaces.

As the lapping method, for example a lapping machine with a cast-iron platen is used; as the lapping abrasive, silicon carbide (SiC) abrasive particles or similar can be used.

2-2-4. Ultrasonic Immersion Cleaning

After lapping, any glass dust, abrasive particles, and cast iron particles are removed by ultrasonic immersion cleaning. Ultrasonic immersion cleaning is performed in an ultrasound dipping vat with a cleanser added. An ultrasound frequency of from several tens of kilohertz to several megahertz can be selected depending on the size of the impurity to be removed, that is, the size of the foreign matter. And as the immersion liquid, an acid cleanser, neutral cleanser, alkaline cleanser, or other aqueous liquid is effective. Also, ultrasonic cleaning under different conditions can be combined. Thereafter, substrates are rinsed in a water cleaning vat and dried under a stream of warm air, to obtain a clean surface with slurry and polishing particles removed.

2-2-5. Scrub-Cleaning

Instead of the above ultrasonic immersion cleaning, or in addition to this cleaning, scrub-cleaning can be performed to clean the surface by scrubbing. After cleaning with a cleanser, rinsing is performed using tap water or industrial water which has been passed through a filter of approximately 0.2 to 1.0 µm as necessary. Then, air-blowing, blowing with hot air, heating, solvent displacement, and other well-known methods are used for drying, to obtain a clean surface.

2-2-6. Main Surface Treatment

Arbitrary selective treatment of the main surface is performed. For example, a double side polisher onto which are affixed pads comprising a prescribed material is used, and while dripping a slurry comprising a prescribed abrasive material suspended in water, mirror-polishing of the main surface of the glass material is performed.

As the prescribed material, it is preferable that a urethane pad comprising cerium oxide be used, from the standpoints of satisfactory machining to a flat state and high machining speed; as the abrasive material, it is preferable that a cerium oxide abrasive material be used, from the standpoint of high machining speed and tendency not to introduce scratches. From the standpoint of complete removal of machining marks (abrasive marks) from lapping, it is preferable that the removal amount in mirror polishing be from 0.05 to 0.10 mm.

Next, weak-alkaline cleaning combined with ultrasound, and then rinsing with distilled water are performed in order, to adequately clean away abrasive material and removed material in particular from the surface.

Further, a double side polisher with a foam urethane pad affixed and a colloidal silica abrasive liquid may for example be used for final polishing of the main surface. From the standpoint of changing the surface roughness of the cerium polishing face to the surface roughness of the colloidal silica polishing face, it is preferable that the removal amount in the final polishing be 0.0001 to 0.001 mm.

Next, weak-alkaline cleaning combined with ultrasound, and then rinsing with distilled water are performed in order, and then precise cleaning and drying, comprising processes of normal-temperature isopropyl alcohol (IPA) immersion and IPA vapor drying, are performed, to obtain a clean substrate for perpendicular magnetic recording media.

2-3. Perpendicular Magnetic Recording Media

Perpendicular magnetic recording media using the above-described substrate is explained.

Figure 2:
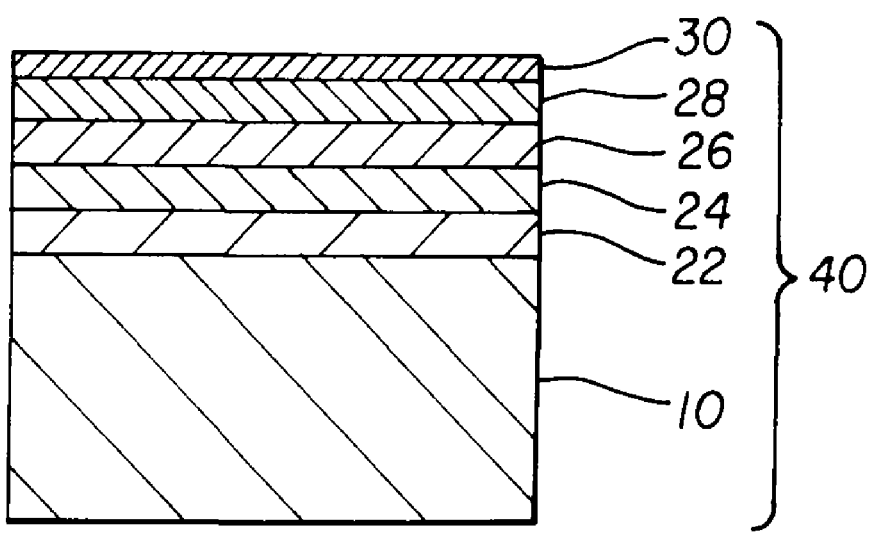
FIG. 2 is a cross-sectional schematic view showing an example of the structure of perpendicular magnetic recording media 40 using the substrate 10 shown in FIG. 1.

FIG. 2 is a cross-sectional schematic view showing an example of the structure of perpendicular magnetic recording media 40 using substrate 10 shown in FIG. 1. According to this figure, perpendicular magnetic recording media 40 comprises substrate 10; soft magnetic layer 22, formed on substrate 10; orientation control layer 24, formed on soft magnetic layer 22; magnetic recording layer 26, formed on orientation control layer 24; protective layer 28, formed on magnetic recording layer 26; and lubricating layer 30, formed on protective layer 28.

2-3-1. Substrate

Substrate 10 may be any type of substrate obtained as described above. For example, a glass substrate as described above, or a substrate comprising aluminum, and similar can be used. The film thickness of substrate 10 may be adjusted according to the size of the substrate; a thickness in the range 0.3 to 1.3 mm is preferable.

2-3-2. Soft Magnetic Layer

Soft magnetic layer 22 is a layer which acts to suppress spreading of the magnetic flux generated from the head during information writing, and to secure an adequate magnetic field in the perpendicular direction. As the material of soft magnetic layer 22, a Ni alloy, Fe alloy, Co alloy, Ta alloy, or Zr alloy can be used. For example, by using CoZrNb, CoTaZr, CoTaZrNb, or another amorphous Co—Zr system alloy, or CoFeNb, CoFeZrNb, CoFeTaZrNb, or another amorphous Fe—Co system alloy, satisfactory electromagnetic transducing characteristics can be obtained. In addition to these, an Fe—B system alloy, and FeTaC or another ferrite-structure Fe-system alloy, or various other soft magnetic materials can be used.

In consideration of the structure of the magnetic head used when writing as well as manufacturing productivity, it is preferable that the film thickness of soft magnetic layer 22 be in the range 10 nm to 100 nm. By making the film thickness 10 nm or greater, spreading of magnetic flux can be suppressed. And by making the film thickness 100 nm or less, excellent productivity can be realized.

2-3-3. Orientation Control Layer

Orientation control layer 24 is a layer which serves to control the orientation and grain diameters of magnetic recording layer 26, which is formed thereupon. For example, a CoCr system alloy, Ti or a Ti alloy, or materials comprising Ru, Pt, Pd, Au, or Ag can be used. In particular, when a layer comprising a CoCr system alloy is used as magnetic recording layer 26, orientation control layer 24 can comprise a CoCr system alloy, Ti or a Ti alloy, or Ru. When magnetic recording layer 26 is a stacked member comprising a Co-system alloy and Pt or Pd, then orientation control layer 24 can be a layer of Pt, Pd, or similar.

Further, when using an easily oxidized material in orientation control layer 24, an arbitrary selective underlayer, not shown in FIG. 2, can be formed between orientation control layer 24 and magnetic recording layer 26. In this case, a high vacuum state is maintained before forming the underlayer, so that adhesion of oxygen to the substrate is prevented, and an unoxidized surface state is obtained for orientation control layer 24.

It is preferable that the film thickness of orientation control layer 24 be within the range 2 nm to 20 nm, with the film prepared appropriately such that ultimately the magnetic characteristics and electromagnetic transducing characteristics of magnetic recording layer 26 are at the desired values. By making the film thickness 2 nm or greater, degradation of the orientation of magnetic recording layer 26 is suppressed. And by making the film thickness 20 nm or less, grain diameters in orientation control layer 24 do not become excessively large, grain diameters in magnetic recording layer 26 can be made small as a result, and degradation of the electromagnetic transducing characteristics can be suppressed.

2-3-4. Underlayer

As explained above, an arbitrary selective underlayer, not shown in FIG. 2, can be formed on orientation control layer 24. The underlayer is a nonmagnetic layer which can realize improved orientation of magnetic recording layer 26 formed thereupon, and smaller grain diameters in magnetic recording layer 26, through improvement of its own orientation and smaller grain diameters, and which can suppress the occurrence of an initial layer of magnetic recording layer 26, which is undesirable from the standpoint of magnetic characteristics. The underlayer can be formed from Cr or similar.

Further, in order to suppress formation of an initial layer in magnetic recording layer 26, it is vital that satisfactory crystallinity of the underlayer be obtained, and it is preferable that the film thickness of the underlayer be 1 nm or greater. By this means, degradation of orientation arising from satisfactory crystallinity of the underlayer can be suppressed, concomitant excellent orientation and separation of crystal grains in magnetic recording layer 26 can also be achieved, and formation of an initial growth layer of magnetic recording layer 26 can be suppressed. And, by holding the film thickness of the underlayer to 20 nm or less, grain diameters in the underlayer are kept from becoming huge, and large increases in grain diameters in magnetic recording layer 26 can also be suppressed.

2-3-5. Magnetic Recording Layer

Magnetic recording layer 26 is the layer provided to record and reproduce information. In order to use magnetic recording layer 26 as a portion of the perpendicular magnetic recording media, the magnetization easy axis must be oriented in the direction perpendicular to the substrate plane. Magnetic recording layer 26 can be formed from a material comprising an alloy containing Co. As the alloy containing Co, a Co—Pt system alloy, and a Co—Cr system alloy, can be used. Further, magnetic recording layer 26 may be a stacked member comprising a plurality of layers, formed by stacking a Co—Pt system alloy or Co—Cr system alloy layer and a Pt, Pd or similar layer.

It is preferable that the film thickness of magnetic recording layer 26 be 8 nm to 20 nm. By setting the thickness to 8 nm or higher, degradation of thermal stability can be suppressed. By setting the thickness to 20 nm or less, the head magnetic field can be made to reach the entire magnetic film, and satisfactory write characteristics can be obtained.

2-3-6. Protective Layer

Protective layer 28 is a layer formed for the purpose of preventing corrosion of magnetic recording layer 26 and preventing damage to magnetic recording layer 26 at the time of contact of the media with the magnetic head. Materials which are normally used, such as a layer mainly comprising C, $SiO_2$, or $ZrO_2$, can be employed in the protective layer 28. It is preferable that the thickness of protective layer 28 be within the range of film thicknesses used in normal perpendicular magnetic recording media, such as 2 nm to 5 nm.

2-3-7. Lubricating Layer

Lubricating layer 30 is a layer formed for the purpose of securing lubricating characteristics between magnetic head and media. Lubricating layer 30 can employ materials normally used as lubricants, such as perfluoro polyether, alcohol fluorides, and carboxylate fluorides. The thickness of lubricating layer 30 can be within the range of film thicknesses used in normal magnetic recording media, such as a range from 0.5 nm to 2 nm.

2-4. Method of Manufacture of Perpendicular Magnetic Recording Media

Below an example of a method of manufacture of perpendicular magnetic recording media of this invention is explained. The following example conforms to the example shown in FIG. 2, and is an example which comprises a protective layer and lubricating layer, which are arbitrary selective elements of this invention, but does not comprise an underlayer.

2-4-1. Cleaning of Glass Substrate 10

Glass substrate 10 is cleaned. In addition to prescribed reagents which are highly effective in removing natural oxide films, such as acids or solution cleaning using alkalis, this cleaning can also employ dry cleaning methods using various plasmas or ions. In particular, from the standpoint of high design dimensional precision, treatment of waste liquid generated from reagents used, automation of cleaning, and similar, it is preferable that a dry cleaning method be used.

2-4-2. Formation of Soft Magnetic Layer 22

The cleaned glass substrate 10 is placed in a sputtering device. A prescribed target is used to form soft magnetic layer 22 by one of various sputtering methods. For example, the DC magnetron sputtering method can be used. Here, it is preferable that the atmosphere in the sputtering device be an argon atmosphere, that the pressure within the device be 0.7 to 1.5 Pa, that no heating be performed within the device, that the film deposition rate be 2 to 10 nm/second, and that the distance between target and substrate be from 5 to 15 nm.

2-4-3. Formation of Orientation Control Layer 24

Orientation control layer 24 is formed on soft magnetic layer 22 by one of a variety of sputtering methods using a prescribed target. For example, the DC magnetron sputtering method can be used. Here, it is preferable that the atmosphere in the sputtering device be an argon atmosphere, that the pressure within the device be 0.7 to 2 Pa, that no heating be performed within the device, that the film deposition rate be 2 to 10 nm/second, and that the distance between target and substrate be from 5 to 15 nm.

2-4-5. Formation of Magnetic Recording Layer 26

Magnetic recording layer 26 is formed on the orientation control layer 24 by one of a variety of sputtering methods using a prescribed target. For example, the DC magnetron sputtering method can be used. Here, it is preferable that the atmosphere in the sputtering device be an argon atmosphere, that the pressure within the device be 0.7 to 4 Pa, that no heating be performed within the device, that the film deposition rate be 2 to 10 nm/second, and that the distance between target and substrate be from 5 to 15 nm.

2-4-6. Formation of Protective Layer 28

The stacked member comprising glass substrate 10 on which are formed in order soft magnetic layer 22, orientation control layer 24, and magnetic recording layer 26 is transferred from the sputtering device to a vacuum device, and the CVD method can be used to form protective layer 28 on magnetic recording layer 26. Other methods which can be used to form protective layer 28 include a sputtering method using a carbon target, and an ion beam method; well-known modes of these methods can be adopted. In particular, when using the CVD method or the ion beam method, protective layer 28 can be thin.

2-4-7. Formation of Lubricating Layer 30

Finally, the stacked member on which protective layer 28 has been formed is removed from the vacuum device, and a dipping method is used to form lubricating layer 30 on protective layer 28, to obtain the perpendicular magnetic recording media of this invention.

2-4-8. Formation of Other Layers (Underlayer)

As explained above, an underlayer, not shown in FIG. 2, can be formed on orientation control layer 24. Here, when an aromatic compound is used in the underlayer, it is preferable that an evaporation deposition method which does not destroy the molecular structure thereof be employed.

As the evaporation deposition method, various sputtering methods may be employed to form an underlayer on orientation control layer 24 using a prescribed target. For example, the DC magnetron sputtering method can be used. When using a sputtering method, it is preferable that the atmosphere in the sputtering device be an argon atmosphere, that the pressure within the device be 2.5 to 12 Pa, that no heating be performed within the device, that the film deposition rate be 2 to 10 nm/second, and that the distance between target and substrate be from 5 to 15 nm.

Embodiments

Below, embodiments of the invention are explained in greater detail, to demonstrate the advantageous results of the invention.

Formation of 14 Substrates for Perpendicular Magnetic Recording Media

Cutting, Inner and Outer Diameter Machining, and Lapping of Glass Material

Each of 14 glass discs cut from plate glass was subjected to inner and outer diameter machining using a grinding machine and a grooved diamond grinding wheel (#400) capable of simultaneous circumferential machining of the inner circumferential surface and the outer circumferential surface; the plate thickness was 1 mm, and lapping was performed to reduce the thickness to 0.53 mm. Lapping was performed using a lapping machine with a cast-iron platen, employing abrasive liquid containing 10 wt % of #1500 silicon carbide (SiC) abrasive, at a machining pressure of 100 gf/cm$^2$. Thereafter cleaning and drying were performed, to obtain 14 substrates.

Main Surface Treatment

Next, the main surfaces of each of the substrates were subjected to first polishing using a well-known double side polisher (SpeedFam 9B double side polisher). At this time, the polishing cloth was a foam urethane polishing pad, the slurry contained 10 wt % ceria of particle diameter 1.5 μm, and the machining pressure was 100 gf/cm$^2$. Thereafter cleaning was performed, to obtain 14 substrates subjected to a first polishing.

Further, the main surfaces of each of the substrates subjected to the first polishing were then subjected to a second polishing, using a well-known double side polisher (SpeedFam 9B double side polisher). At this time, the polishing cloth was a foam urethane polishing pad, the slurry contained 15 wt % colloidal silica of particle diameter 80 nm, and the machining pressure was 100 gf/cm$^2$. Thereafter cleaning and drying were performed, to obtain 14 donut-shape amorphous glass substrates, of outer diameter 48 mm, inner diameter 12 mm, and plate thickness 0.5 mm. Below, these substrates are referred to as Substrates 1 through 14.

Finish-Polishing of Six Substrates for Perpendicular Magnetic Recording Media (Substrate Group A)

Finish-polishing was performed for six substrates (Substrates 1 through 6 (substrate group A)) out of the above 14 substrates. Finish-polishing was performed using a foam urethane polishing pad as the polishing cloth, with a machining pressure of 100 gf/cm$^2$, and with the particle diameter and concentration of the colloidal silica used in the slurry varied. The surface roughness (Ra) was measured by atomic force microscopy (AFM), with 2×2 μm pixels arranged in a region of 512 vertical and 512 horizontal pixels. Table 1 shows the relation between the finish-polishing slurry conditions (slurry concentration and colloidal silica particle diameter) used for substrate group A, and the surface roughnesses (Ra) obtained for Substrates 1 through 6.

TABLE 1

| | | Slurry concentration | |
|---|---|---|---|
| | | 15 wt % | 7 wt % |
| Colloidal silica particle diameter | 80 nm | Substrate 1: 0.10 nm | Substrate 4: 0.21 nm |
| | 300 nm | Substrate 2: 0.30 nm | Substrate 5: 0.38 nm |
| | 450 nm | Substrate 3: 0.52 nm | Substrate 6: 0.60 nm |

Etching of Eight Substrates for Perpendicular Magnetic Recording Media (Substrate Group B)

Of the above 14 substrates, 8 (Substrates 7 through 14 (substrate group B)) were subjected to etching treatment using hydrofluoric acid. Specifically, Substrates 7 through 14 were all immersed for 1 minute in hydrofluoric acid solutions of different concentrations. After immersion, rinsing was immediately performed using deionized water. Table 2 shows the relation between the etching conditions (hydrofluoric acid concentration) and the surface roughnesses (Ra) obtained for Substrates 7 through 14.

TABLE 2

| Substrate number | Concentration (vol %) | Ra (nm) |
|---|---|---|
| Substrate 7 | 0.01 | 0.20 |
| Substrate 8 | 0.1 | 0.29 |
| Substrate 9 | 1 | 0.41 |
| Substrate 10 | 2 | 0.52 |
| Substrate 11 | 5 | 0.70 |
| Substrate 12 | 10 | 0.98 |
| Substrate 13 | 15 | 1.34 |
| Substrate 14 | 20 | 1.56 |

Scrub-Cleaning, Ultrasonic Cleaning, Isopropyl Alcohol (IPA) Cleaning

Substrates 1 through 14 (substrate groups A and B) subjected to finish polishing or etching in this way were subjected to scrub-cleaning, ultrasonic cleaning, and isopropyl alcohol (IPA) cleaning in order, to obtain clean surfaces for Substrates 1 through 14.

Formation of 14 Types of Perpendicular Magnetic Recording Media

Substrates 1 through 14 (substrate groups A and B) obtained in this way were each placed in a sputtering device. On each substrate were deposited, in order, a 100 nm amorphous soft magnetic layer comprising Co-4Zr-6Nb; a 10 nm orientation control layer comprising Ru; a 15 nm magnetic recording layer comprising Co-19Cr-10Pt-8SiO2 alloy; and a 5 nm protective layer comprising carbon. In each case sputtering deposition was performed in an Ar gas atmosphere at a pressure of 5 mTorr by the DC magnetron sputtering method.

Thereafter, the stacked members from the substrate to the protective layer were removed from the sputtering device, and a dipping method was used to form a 2 nm liquid lubricant layer of perfluoro polyether on the protective layer, to obtain 14 types of magnetic recording media (Media 1 through 14). In the following description, the set of media comprising substrates belonging to substrate group A may be called media group A, and the set of media comprising substrates belonging to substrate group B may be called media group B.

Calculation of Data Used in Evaluations

Substrate Surface Roughness (Ra)

Substrate surface roughnesses (Ra) for Media 1 through 14 (media groups A and B) were measured and determined as described above.

Orientation Dispersion Angle (Δθ50)

The orientation dispersion angles (Δθ50) of the magnetic recording layers of Media 1 through 14 (media groups A and B) were determined from the half-maximum peaks of rocking curves for the Co (002) peak obtained by X-ray diffraction.

Root Mean Square Inclination Angle (θsΔq)

First, ion milling is performed to remove the lubricating layer and protective layer from one surface of each of the Media 1 through 14 (media groups A and B). Next, mechanical polishing of the other surface is performed, and after removing the lubricating layer, protective layer, magnetic recording layer, orientation control layer, and soft magnetic layer, ion milling is performed to finish the remaining substrate surface.

Then, the magnetic recording layer exposed on the side of the one surface is observed from the perpendicular direction using atomic force microscopy (AFM) to determine the root mean inclination (sΔq). Data obtained in atomic force microscopy (AFM) observations are collections of height information at equal intervals on the measurement surface of the substrate, and the height information at coordinates (i,j) is described by Z(i,j). When determining the root mean square (sΔq) from this data, the above equations (1) and (2) become the following equations (3) and (4).

Equation 3

$$\rho_{i,j} = \left[\left(\frac{z(i,j) - z(i-1,j)}{\Delta x}\right)^2 + \left(\frac{z(i,j) - z(i-1,j)}{\Delta y}\right)^2\right]^{\frac{1}{2}} \quad (3)$$

Equation 4

$$S\Delta q = \sqrt{\frac{1}{(M-1)(N-1)}\sum_{j=2}^{N}\sum_{i=2}^{M} \rho_{i,j}} \quad (4)$$

Here, the $\Delta x$ and $\Delta y$ in the above equation (3) are data intervals in the x direction and in the y direction. These measurements were performed over a region in which 2×2 μm pixels were arranged with 512 pixels vertically and 512 pixels horizontally, so that the above intervals are both approximately 3.9 nm. Further, in equation (4), M and N are the number of data points in the x direction and in the y direction, and as stated above, these measurements were performed for 512 data points in both the x and in the y directions.

Next, the inverse tangent of equation (4), that is, (tan−1 (sΔq)), was calculated to obtain the root means square inverse angle (θsΔq).

S/N Characteristics

After writing signals at 300 kFCI to Media 1 through 14 (media groups A and B), the S/N characteristic for read signal was evaluated. The S/N characteristic is, from the definition of S/N, the common logarithm of the ratio of the signal output intensity to noise, multiplied by 20.

Quantities for Evaluation

Relation Between Orientation Dispersion Angle (Δθ50) and Surface Roughness (Ra)

Figure 3:
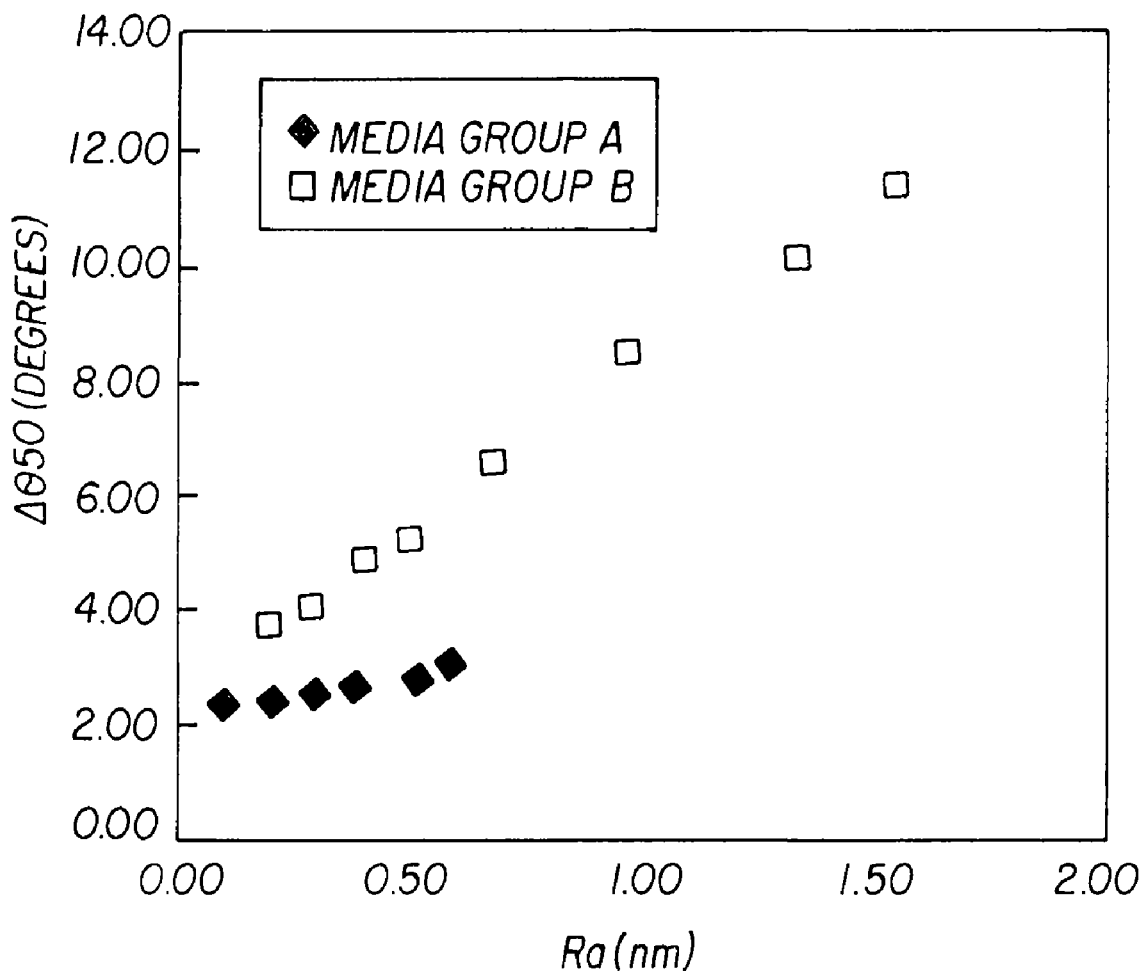
FIG. 3 is a graph showing the relation between the orientation dispersion angle (Δθ50) of the magnetic recording layer and the substrate surface roughness (Ra), for media group A and media group B.

FIG. 3 is a graph showing the relation between the orientation dispersion angle (Δθ50) of the magnetic recording layer and the substrate surface roughness (Ra), for media groups A and B. According to this figure, different trends are evident for Media 1 through 6 (media group A), comprising substrates for which finish polishing was performed, and for Media 7 through 14 (media group B), comprising substrates subjected to etching treatment. In other words, it is seen that there is a significant difference between media groups A and B in the correlation between the orientation dispersion angle (Δθ50) and the surface roughness (Ra).

Relation Between Orientation Dispersion Angle (Δθ50) and Root Mean Square Inclination (sΔq)

Prior to deposition of the several layers, the substrates used in Media 1 through 14 (media groups A and B) were observed by atomic force microscopy (AFM). The result was subjected to cutoff filter processing using a Gaussian filter with the cutoff wavelength varied, to obtain the root mean square inclination angle (θsΔq). Then, for each of the cutoff wavelengths, the R-squared value (coefficient of determination) when the relation between the root means square inclination angle (θsΔq) and the orientation dispersion angle (Δθ50) of the magnetic recording layer was approximated by a linear function using the least-squares method was determined.

Figure 4:
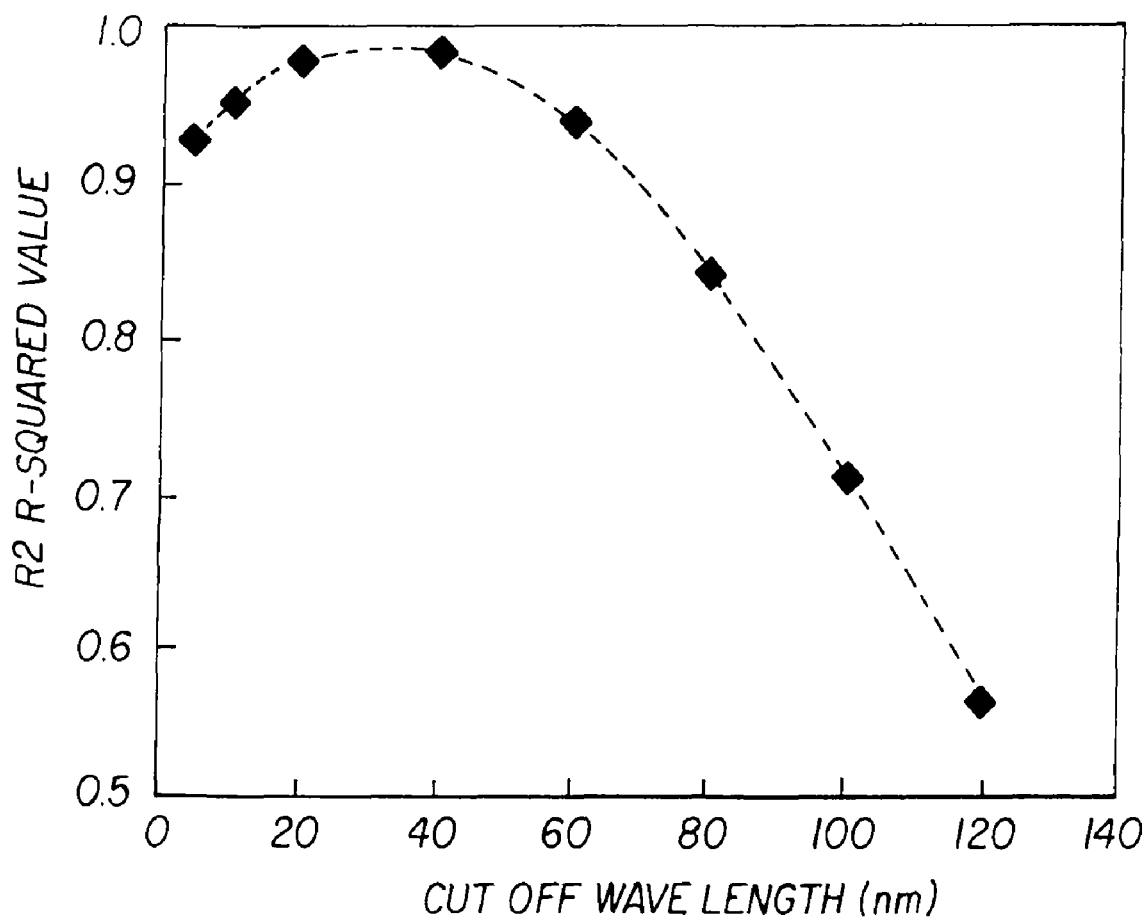
FIG. 4 is a graph showing the relation between the R-squared value and the cutoff wavelength for media group A and media group B.

FIG. 4 is a graph showing the relation between the R-squared value and the cutoff wavelength for media groups A and B. According to the figure, when the cutoff wavelength is approximately 40 nm, the R-squared value is a maximum, and it is seen that the correlation between the root mean square inclination angle (θsΔq) and the orientation dispersion angle (Δθ50) of the magnetic recording layer is best.

Further, the magnetic recording layer exposed on one side of each of the media as described above was observed by transmission electron microscopy (TEM), and the average grain diameter D of magnetic grains constituting the magnetic recording layer, as well as the average interval δ between the grains, were measured. As a result, the average grain diameter D was 8.0 nm, and the average interval between grains δ was 1.5 nm. Hence the value of the root mean square inclination angle (θsΔq) when the cutoff wavelength was approximately 40 nm was a length equal to approximately four times the sum (D+δ) of the average grain diameter D of magnetic grains and the average interval between grains δ. Hence it was found that when the root mean square inclination angle (θsΔq) is determined from the results of atomic force microscopy (AFM), the above period λ must be subjected to 4(D+δ) cutoff filter processing.

Figure 5:
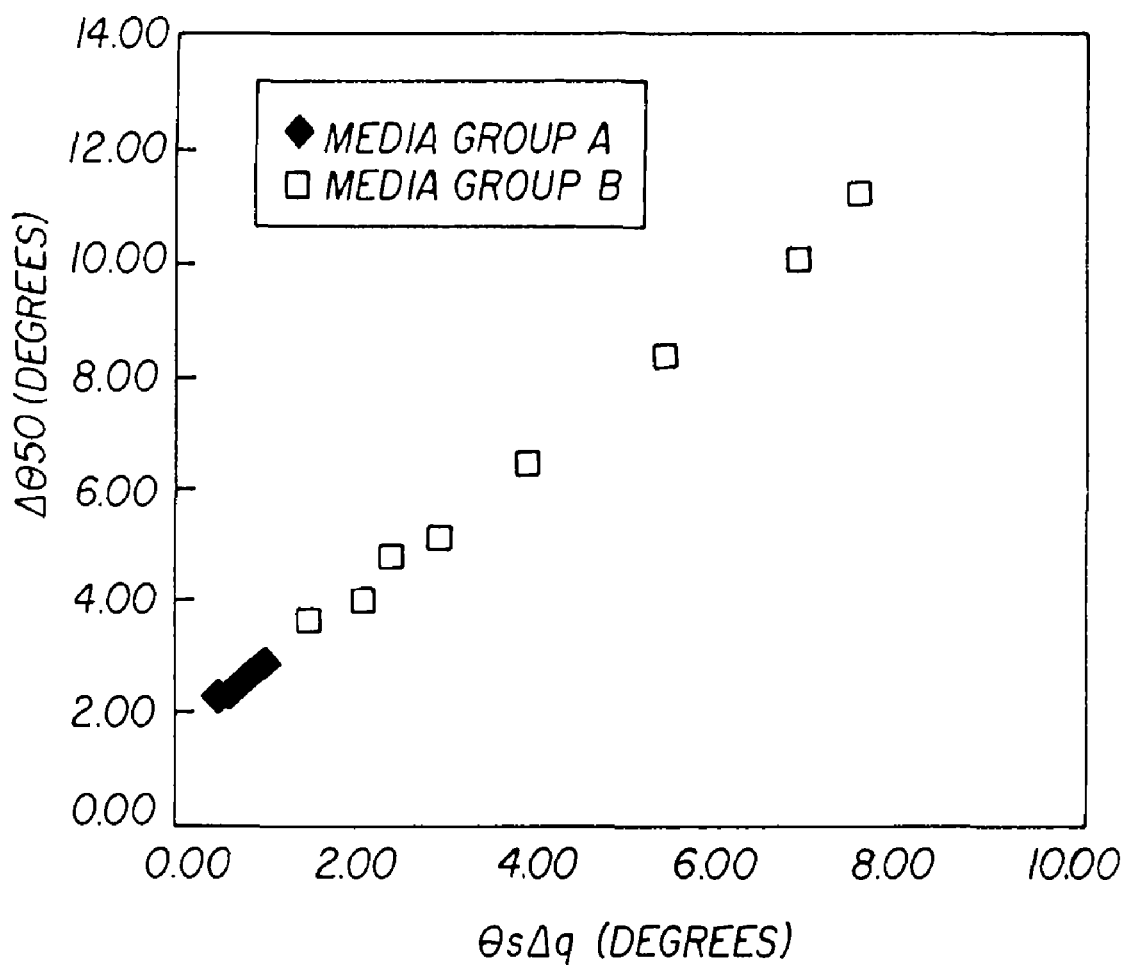
FIG. 5 is a graph showing the relation between the orientation dispersion angle (Δθ50) of the magnetic recording layer, and the root mean square inclination angle (θsΔq) obtained by performing 40 nm cutoff filter processing and performing root mean square inclination angle (θsΔq) processing, for media group A and media group B.

FIG. 5 is a graph showing the relation between the orientation dispersion angle (Δθ50) for the magnetic recording layer, and the root mean square inclination angle (θsΔq) determined by performing 40 nm cutoff filter processing, for media groups A and B. According to the figure, extremely good correlation is obtained between Media 1 through 6, the substrates of which were finish-polished, and Media 7 through 14, the substrates of which were etched.

Relation Between S/N Characteristic and Orientation Dispersion Angle (Δθ50)

Figure 6:
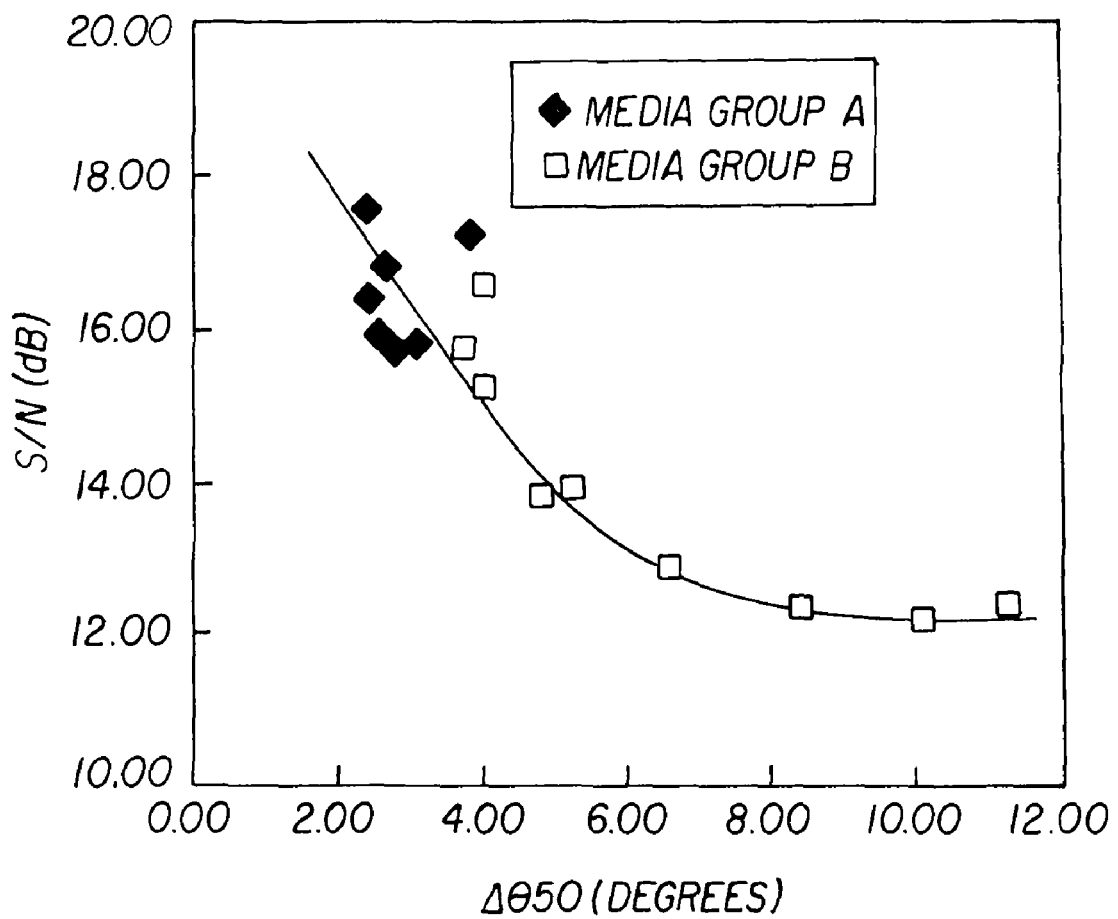
FIG. 6 is a graph showing the relation between S/N characteristics and the orientation dispersion angle (Δθ50) of the magnetic recording layer for media group A and media group B.

Based on the correlation in FIG. 5, the relation between S/N characteristic and orientation dispersion angle (Δθ50) was determined. FIG. 6 is a graph showing the relation between S/N characteristic and orientation dispersion angle (Δθ50) of the magnetic recording layer for media groups A and B. According to the figure, when the orientation dispersion angle (Δθ50) is approximately 8° or lower, excellent S/N characteristics are obtained, and when the angle is approximately 5° or lower, still more excellent S/N characteristics are attained.

Relation Between S/N Characteristic and Root Mean Square Inclination Angle (θsΔq)

Figure 7:
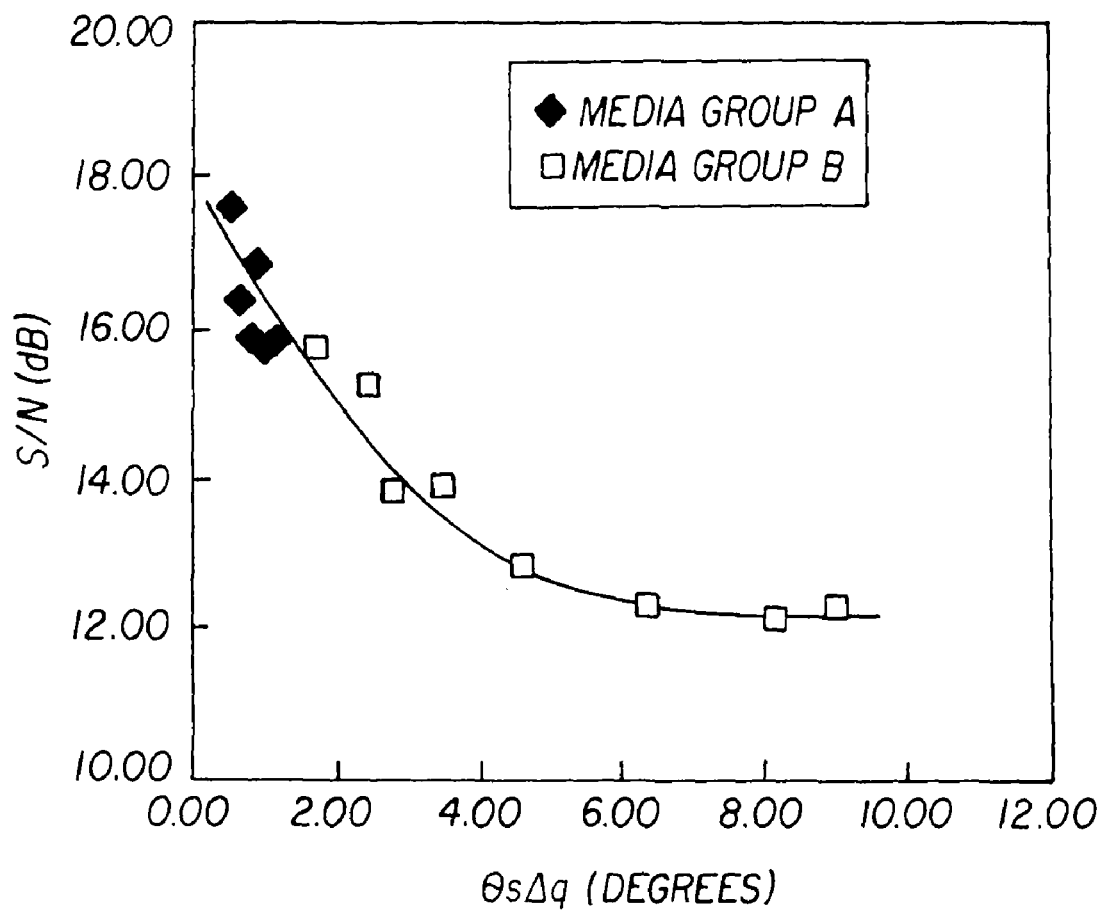
FIG. 7 is a graph showing the relation between S/N characteristics and root mean square inclination angle (θsΔq) for media group A and media group B.

Finally, based on the results of FIG. 5 and FIG. 6, the relation between the S/N characteristic and the root mean square inclination angle (θsΔq) was determined. FIG. 7 is a graph showing the relation between the S/N characteristic and root mean square inclination angle (θsΔq) for media groups A and B. According to the figure, an excellent S/N characteristic is obtained when the root mean square inclination angle (θsΔq) is approximately 5° or less, and a still more excellent S/N characteristic is obtained when the angle is approximately 3° or less.

INDUSTRIAL APPLICABILITY

In this invention, by focusing on the substrate surface shape which exerts an influence to increase the orientation dispersion angle (Δθ50) of the orientation control layer, and in particular by appropriately controlling the root mean square inclination angle (θsΔq) of the substrate, a high level of quality and stability of read signals of the perpendicular magnetic recording media can be achieved. Hence this invention is promising for application to fixed magnetic recording devices, which are external storage devices for computers and consumer equipment, from which improved read signal quality has increasingly been sought in recent years.

Thus, a substrate for a perpendicular magnetic recording media and a perpendicular magnetic recording media using the same has been described according to the present invention. Many modifications and variations may be made to the techniques and structures described and illustrated herein without departing from the spirit and scope of the invention. Accordingly, it should be understood that the devices described herein are illustrative only and are not limiting upon the scope of the invention.

What is claimed is:

1. A substrate for a donut-shape perpendicular magnetic recording medium having a perpendicular recording layer formed above the substrate, the substrate comprising:
   a main surface;
   an inner circumferential surface extending along an inner periphery of the main surface; and
   an outer circumferential surface extending along an outer periphery of the main surface,
   wherein, when a shape of the main surface is defined by a function Z(x,y) of x-y coordinates, a root mean square inclination angle (θsΔq), defined as an inverse tangent (tan$^{-1}$(sΔq)) of a root mean square inclination (sΔq), which is a root mean square over the entire main surface of a micro-region surface inclination (Δρ) of the main surface, expressed by the following equation, is 5° or less:

$$\Delta\rho = \left[\left(\frac{\partial z(x, y)}{\partial x}\right)^2 + \left(\frac{\partial z(x, y)}{\partial y}\right)^2\right]^{\frac{1}{2}},$$

wherein a surface shape of the substrate in a cross-sectional view is characterized as a sinusoidal curve, with a period λ of the curve being twice (D+δ) or greater, where D is an average grain diameter of magnetic grains in the perpendicular recording layer, and δ is an average interval between the magnetic grains.

2. The substrate according to claim 1, wherein the root mean square inclination angle (θsΔq) is 3° or less.

3. The substrate according to claim 1, wherein the period λ is four times (D+δ) or greater.

4. The substrate according to claim 1, wherein the micro-region surface inclination (Δρ) of the main surface is smaller than 2×2 μm pixels.

5. A perpendicular magnetic recording medium comprising:
   a substrate; and
   at least a soft magnetic layer, an orientation control layer, and a magnetic recording layer formed on the substrate,
   wherein the substrate comprises:
   a main surface;
   an inner circumferential surface extending along an inner periphery of the main surface; and
   an outer circumferential surface extending along an outer periphery of the main surface,
   wherein, when a shape of the main surface is defined by a function Z(x,y) of x-y coordinates, a root mean square inclination angle (θsΔq), defined as an inverse tangent (tan$^{-1}$(sΔq)) of a root mean square inclination (sΔq), which is a root mean square over the entire main surface of a micro-region surface inclination ($\Delta\rho$) of the main surface, expressed by the following equation, is 5° or less:

$$\Delta\rho = \left[\left(\frac{\partial z(x,y)}{\partial x}\right)^2 + \left(\frac{\partial z(x,y)}{\partial y}\right)^2\right]^{\frac{1}{2}},$$

wherein a surface shape of the substrate in a cross-sectional view is characterized as a sinusoidal curve, with a period $\lambda$ of the curve being twice (D+$\delta$) or greater, where D is an average grain diameter of magnetic grains in the perpendicular recording layer, and $\delta$ is an average interval between the magnetic grains.

6. The perpendicular magnetic recording medium according to claim 5, wherein the micro-region surface inclination ($\Delta\rho$) of the main surface is smaller than 2×2 µm pixels.

* * * * *